Nov. 10, 1931.　　　F. KEIDEL　　　1,831,180
SEAL
Filed March 25, 1930
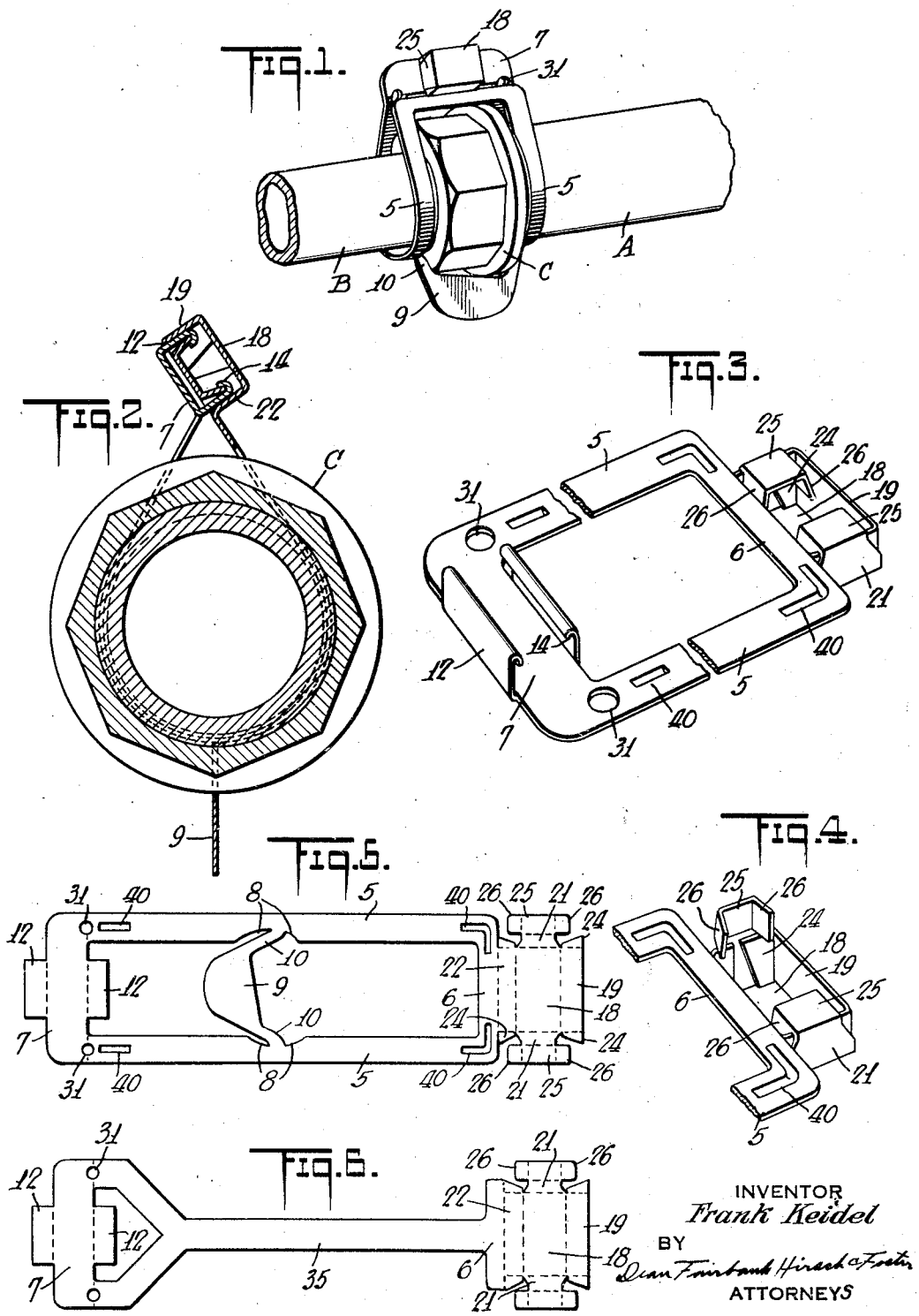
INVENTOR
Frank Keidel
BY
ATTORNEYS Patented Nov. 10, 1931

1,831,180

UNITED STATES PATENT OFFICE

FRANK KEIDEL, OF ELMHURST, NEW YORK, ASSIGNOR TO THE INTERNATIONAL SEAL AND KNOT PROTECTOR CO., OF NEW YORK, N. Y., A CORPORATION OF NEW YORK

SEAL

Application filed March 25, 1930. Serial No. 438,671.

This invention relates to seals, and is of the type in which the relatively movable parts will automatically lock in sealing position after being applied to an article to be sealed, and when in sealed or locked position cannot be opened without mutilation thereof to such a degree as will render the seal unfit for further use.

One object of my invention is to provide an improved seal particularly adapted for use for sealing pipe unions or couplings, and which is so constructed that when in sealing position, uncoupling of the union or coupling will result in rupture of the seal.

A further object of the invention is to so construct the seal, that the union or coupling with which the seal is used, is exposed for inspection, even though secured against uncoupling without rupture of the seal.

Another object of the invention is to permit of engagement of a tool to the union or coupling while the seal is in place so that the joint may be tightened without rupturing the seal in case of leaks.

A further object is to provide a one piece construction so cut from sheet metal that it may be wrapped around the pipe union and have its ends secured together, but at the same time leave the parts of the union exposed while preventing the separation of the parts of the union.

Other advantages will be pointed out hereinafter, or will be apparent from an inspection of the embodiment illustrated in the accompanying drawings.

In the drawings which illustrate two forms of the invention:

Fig. 1 is a perspective view of two lengths of pipe secured together with a suitable union or coupling with a seal constructed in accordance with the present invention in locking position thereon, Fig. 2 is a transverse section on an enlarged scale, Fig. 3 is a perspective view of the seal partly broken away, and on an enlarged scale before the seal has been placed in sealing position, Fig. 4 is a detailed enlarged perspective view of one end of the seal, one of the interlocking members being shown in raised position, Fig. 5 is a plan view of the blank from which one form of the seal is made, and Fig. 6 is a plan view of a blank for a slightly modified form of seal.

In the construction illustrated in Figs. 1 to 5, the seal is formed of a sheet of metal or other suitable material cut to provide an elongated rectangular open body portion having side walls 5 and end walls 6 and 7. Extending across the body portion, intermediate of its ends, and from one side wall to the other, there is a transverse substantially U-shaped member 9. The end portions 10 of this transverse member are relatively narrow and weak and join the side walls between a pair of recesses 8 which weaken the side walls at these points and space the end portions 10 apart to a distance approximating the distance between the side walls 5.

One end 7 of the rectangular body portion is provided with a pair of oppositely extending flanges or wings 12, which are adapted to be bent to parallelism at right angles to the plane of the end 7, as shown at the left hand end of Fig. 3. The free end edge of each member 12 is turned inwardly to form a hook or catch 14.

The opposite end 6 of the rectangular body is provided with an extension so shaped that the parts thereof may be bent to form a casing as shown at the right hand end of Fig. 3 and into which the flanges or wings 12 may be locked. The extension has a main body portion 18 adapted to occupy a position in a plane substantially parallel with the plane of the rectangular portion, but offset with respect thereto. The portion 18 provides the bottom wall for the casing. The outer side wall is formed by a portion 19 bent to a position at substantially right angles to the portion 18, and the end walls of the casing are formed by portions 21 similarly bent. The other side wall is formed by a portion 22 which connects the bottom wall 18 and the wall 6. Wing portions 24 extend from the ends of side walls 19 and 22 and are bent inwardly to reinforce and overlie the end walls 21. The end walls 21 have extensions 25 bent in to form a partial top wall for the casing and these have end flanges 26 bent inwardly into the casing or housing. In Fig. 4 one of these extensions is shown as bent inwardly to final position, while the other member is illustrated in the position which it occupies before being bent into the housing.

The wings or flanges 26 are spaced to a slight distance from the walls 19 and 22, and provide depending walls beneath which the inwardly turned portions 14 of the wings are adapted to engage to hold the seal in sealing position after the body portion is bent upon itself to form a loop, and the wings 12 are forced into the casing or housing to occupy positions between the wings 26 and the side walls 19 and 22 of the housing.

When used to seal the union between two lengths of pipe, the seal will be positioned as shown in Fig. 1. In this figure, one length of pipe A is connected to another length B by a union C of conventional type. The seal is placed in position by bending the same around the two lengths of pipe with the union C positioned in the open body portion thereof. The end 7 is bent at a slight angle to the side walls 5, the point of bending being determined by holes 31 in the walls 5, and the wing member 12 are forced into the housing at the opposite end of the body portion sufficiently to cause the inwardly turned portions or catches 14 to snap beneath the inner edges of the wings 26. The resiliency of the wings 26 will permit of the free passage of the wings 12, between the wings 26 and the side walls of the housing, but when the inturned portions 14 of the wings 12 engage behind the inner edges of the wings 26, the withdrawal of the wings 12 from the housing is prevented unless there be such mutilation of the seal as to render it incapable of further use. The walls 5 may be reinforced by embossed portions 40 adjacent to the weakened points 31 to insure bending at those points.

The distance between the sides 5 of the body portion is but slightly greater than the length of the coupling so that the side portions 5 when they are passed around the pipe sections A and B embrace the coupling C. The threaded section of the member B is larger in diameter than said pipe section, and the seal is so proportioned as to prevent withdrawal of this threaded section therethrough in an attempt to uncouple the union with the seal in sealing position. The transverse member 9 is bent out to right angles to the adjacent portions of the walls 5 and extends around the coupling.

With the seal in position, any attempt to uncouple the union C will result in a spreading of the sides 5 of the body portion, and a consequent rupture of one or both of the ends 10 of the transverse member 9, or the rupture of one of the sides 5 of the body portion at the weakened points 31.

While uncoupling of the union is effectively prevented, it will be noted that the same is not enclosed, but instead may be freely inspected, and should it be found that a leak has developed in the union, it may also be engaged with a tool and turned up to tightened position without effecting a rupture of the seal.

In Fig. 6 is illustrated a blank for a modified form of seal. The interlocking members of this seal are of the same construction as those described heretofore, but they are connected by a single relatively narrow member 35 as distinguished from the pair of spaced side walls 5 illustrated in Figs. 1 to 5. In this form of the invention, the body portion 35 is adapted to be threaded through an eye member of a hasp, or through two aligned eye members, after which it is bent upon itself, and the interlocking members engaged with each other, as in the heretofore described form of the invention.

While in the present instance, the invention has been illustrated in two of its preferred forms, it is to be understood that it may be carried out in many other embodiments, and that the details of construction and design and relative proportioning of parts may be varied within comparatively wide limits without departing from the spirit of the invention.

Having thus described my invention, what I claim as new and desire to secure by Letters Patent is:

1. A seal including a body portion having transversely extending, substantially parallel, end sections formed from a single piece of sheet material, one of said end sections having oppositely disposed parallel flanges with inturned end edges, and the other end section having integral therewith a casing adapted to receive said flanges and having means for interlocking therewith to lock said end sections together.

2. A seal formed of a single piece of sheet metal and having an elongated body portion adapted to be bent to loop form to bring the ends into juxtaposition, said ends having transversely extending sections, one of said sections having a pair of oppositely disposed flanges, and the other section having a casing integral therewith and formed with an open side substantially in the plane of said last mentioned section and adapted to be covered by the first mentioned section and to receive and retain said flanges.

3. A seal including an elongated body portion adapted to be bent to loop form to bring the end portions into juxtaposition; one of said end portions having a casing with an open side substantially in the plane of said end portion, and the other end portion being adapted to cover said open side and having portions projecting into said casing, and means for locking said last mentioned portions in position within the casing.

4. A seal having an elongated body formed of sheet material and provided with a casing at one end thereof open at one side and having flanges extending thereinto from said open side, and the other end of said body being adapted to cover the open side of said casing and having flanges adapted to extend into said casing and interlock with said first mentioned flanges.

5. A seal including a body portion having end sections formed from a single piece of sheet material, one of said end sections having oppositely disposed parallel flanges with inturned edges, and the other end section having integral therewith a casing adated to receive said flanges, and means within said casing for interlocking therewith to lock said end sections together.

6. A seal for pipe unions, including an open sheet metal blank having parallel side portions adapted to embrace pipes upon opposite sides of a union, and a pair of transversely extending end portions connecting said side portions, said end portions having projections integral therewith and disposed upon the outer edges thereof between said side portions, said projections being adapted to engage and automatically lock together upon being brought into registering engagement.

7. A seal for pipe unions, including an open sheet metal blank having a pair of parallel side portions adapted to embrace pipes upon opposite sides of a union, and a pair of transversely extending end portions connecting said side portions, one of said end portions having a casing forming an extension at the outer edge thereof between said side portions and having an inturned flange, and the other end portion having a projection adapted to enter said casing and engage with said inturned flange to automatically lock said end portions together to prevent removal of said seal without rupturing the latter.

Signed at New York city, in the county of New York and State of New York, this 24th day of March, A. D. 1930.

FRANK KEIDEL.